United States Patent
Lambert et al.

(10) Patent No.: US 7,866,134 B2
(45) Date of Patent: Jan. 11, 2011

(54) POSITIVE GRASS COLLECTOR ATTACHMENT POSITIONING

(75) Inventors: Matt Lambert, Summerville, SC (US); Nicholas Hansen, Columbia, SC (US)

(73) Assignee: Husqvarna Outdoor Products N.A., Inc., Augusta, GA (US)

( * ) Notice: Subject to any disclaimer, the term of this patent is extended or adjusted under 35 U.S.C. 154(b) by 0 days.

(21) Appl. No.: 12/329,690

(22) Filed: Dec. 8, 2008

(65) Prior Publication Data

US 2010/0139230 A1    Jun. 10, 2010

(51) Int. Cl.
*A01D 43/00* (2006.01)
*A01D 43/06* (2006.01)

(52) U.S. Cl. .................................. 56/202; 56/320.2
(58) Field of Classification Search ................... 56/202, 56/16.6, 320.2, 194; 280/47.21; 15/79.2
See application file for complete search history.

(56) References Cited

U.S. PATENT DOCUMENTS

| | | | | |
|---|---|---|---|---|
| 1,182,365 A | * | 5/1916 | Goldberg | 56/199 |
| 2,320,387 A | * | 6/1943 | Schroeder | 414/446 |
| 2,801,862 A | | 8/1957 | Parker et al. | |
| 2,855,744 A | | 10/1958 | Phelps | |
| 2,882,668 A | * | 4/1959 | Murillo | 56/12.8 |
| 3,636,686 A | * | 1/1972 | Meyer et al. | 56/320.2 |
| 3,757,503 A | * | 9/1973 | Soldavini | 56/202 |
| 3,893,284 A | | 7/1975 | Thon et al. | |
| 3,949,540 A | | 4/1976 | Christopherson et al. | |
| 4,047,367 A | | 9/1977 | Thorud | |
| 4,084,284 A | * | 4/1978 | Hastings | 15/79.2 |
| 4,203,276 A | | 5/1980 | Plamper | |
| 4,214,424 A | * | 7/1980 | Gobin | 56/202 |
| 4,258,538 A | | 3/1981 | Morse | |
| 4,306,408 A | | 12/1981 | Christopherson et al. | |
| 4,476,668 A | * | 10/1984 | Reilly | 56/202 |
| 4,522,019 A | | 6/1985 | Edwards et al. | |
| 4,709,541 A | * | 12/1987 | Broman et al. | 56/202 |
| 4,796,322 A | * | 1/1989 | Steed et al. | 15/79.2 |
| 5,033,258 A | * | 7/1991 | Morse | 56/2 |
| 5,064,338 A | * | 11/1991 | Lawrence | 414/685 |
| 5,692,262 A | | 12/1997 | Haupt et al. | |
| 5,794,864 A | | 8/1998 | Hammett et al. | |
| 6,050,576 A | * | 4/2000 | Tanner et al. | 280/47.21 |
| 6,085,509 A | | 7/2000 | Plamper et al. | |
| 6,195,971 B1 | * | 3/2001 | Stewart et al. | 56/202 |

(Continued)

FOREIGN PATENT DOCUMENTS

EP          803179 A1  *  10/1997

(Continued)

*Primary Examiner*—Árpád Fábián Kovács
(74) *Attorney, Agent, or Firm*—Pearne & Gordon LLP

(57) ABSTRACT

A grass mower for cutting grass and collecting cut grass includes a main body, two handle brackets, a handle, a collector element, and two collector brackets. The main body is for cutting grass. The two handle brackets are oppositely mounted on lateral sides of the main body. The handle is coupled to the two handle brackets. The collector element is for collecting the cut grass. The collector element is defined by a frame, and the frame includes at least two limb elements located on substantially opposite sides of the collector element. The two collector brackets are respectively mounted to the two handle brackets and are configured to respectively accommodate the limb elements, wherein the collector element is mounted on the mower free from the handle.

21 Claims, 11 Drawing Sheets

U.S. PATENT DOCUMENTS

| | | | |
|---|---|---|---|
| 6,434,918 B1 * | 8/2002 | Csonka et al. | 56/13.4 |
| 6,449,933 B1 * | 9/2002 | Umemoto et al. | 56/13.3 |
| 6,513,312 B1 * | 2/2003 | Ishimori et al. | 56/203 |
| 6,584,757 B2 * | 7/2003 | Komorida et al. | 56/202 |
| 6,625,818 B2 | 9/2003 | Putnam | |
| 6,877,301 B2 | 4/2005 | Nwosu et al. | |
| 6,928,799 B2 | 8/2005 | Nwosu et al. | |
| 7,219,489 B2 * | 5/2007 | Tada et al. | 56/202 |
| 2003/0221403 A1 | 12/2003 | Hancock et al. | |
| 2005/0055994 A1 | 3/2005 | Hebbard et al. | |
| 2006/0042215 A1 | 3/2006 | Plouraboue et al. | |
| 2006/0201125 A1 | 9/2006 | Docken et al. | |

FOREIGN PATENT DOCUMENTS

| | | | |
|---|---|---|---|
| JP | 08205651 A | * | 8/1996 |

* cited by examiner

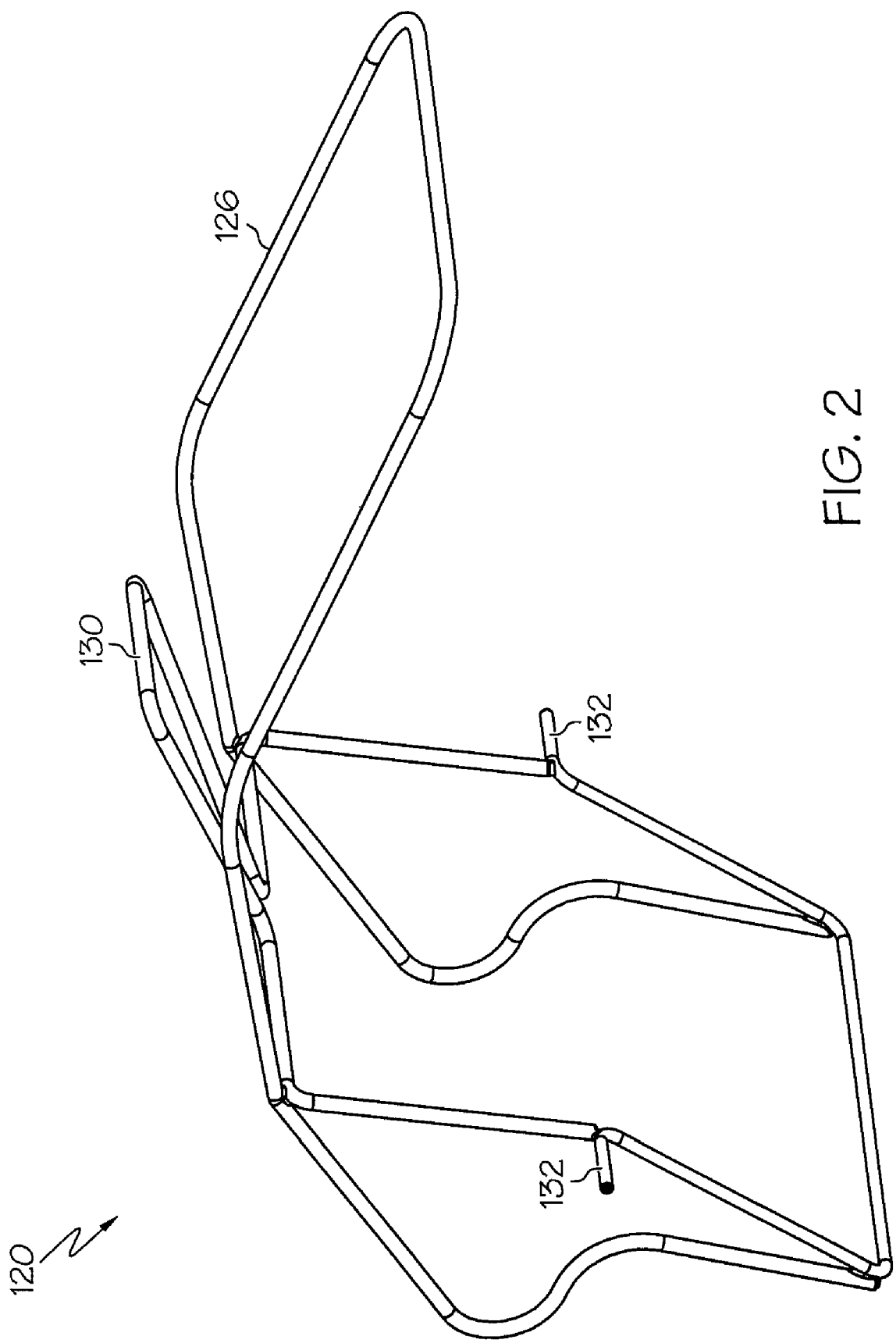

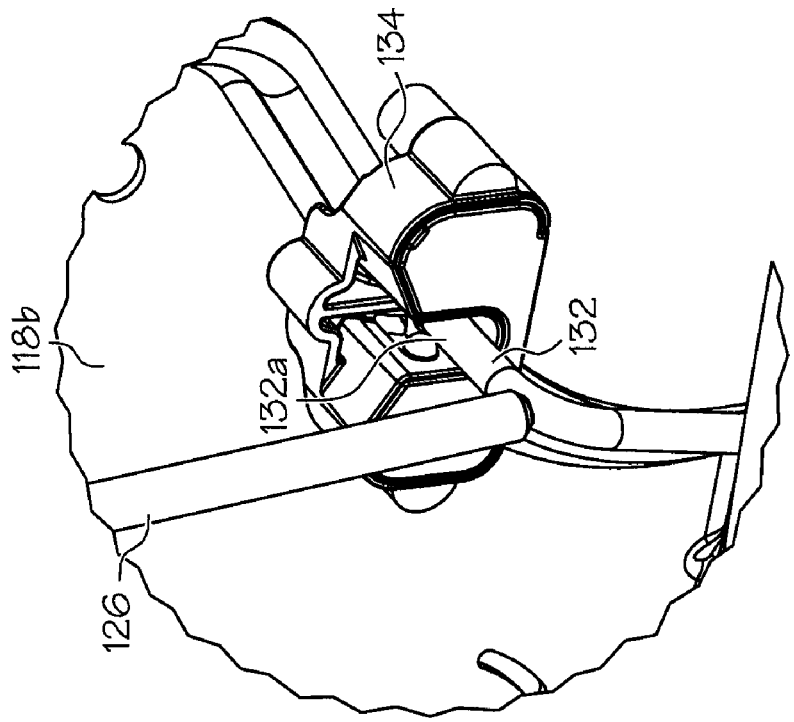
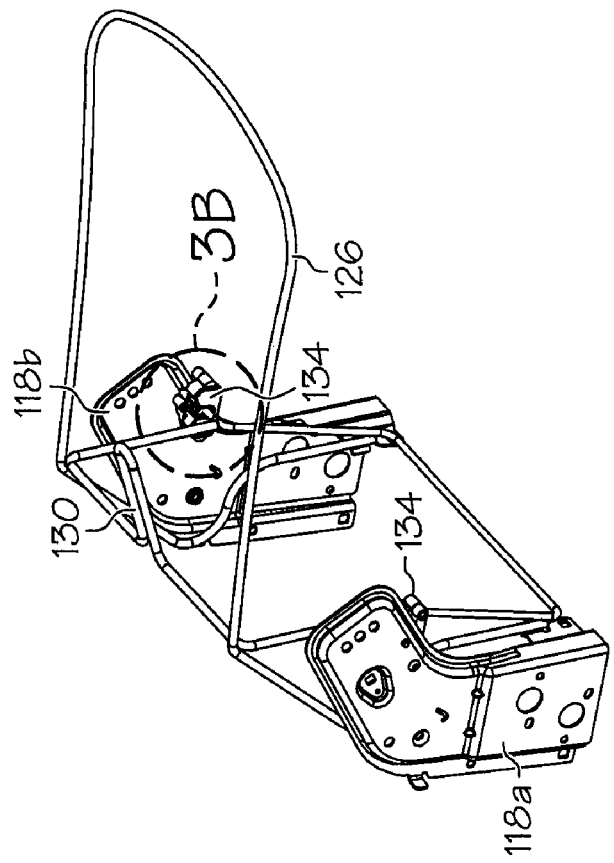

7,866,134 B2

POSITIVE GRASS COLLECTOR ATTACHMENT POSITIONING

FIELD OF THE INVENTION

The present invention relates generally to means for collecting cut grass, and more particularly, to positioning of such means or location indicators for positioning of such means.

BACKGROUND OF THE INVENTION

A grass mower for collecting cut grass may be equipped with a collector, such as a bag or a box, in which the cut grass is gathered. Attachment of such a collector onto the mower can be cumbersome in that proper connection of a discharge portion of the mower with an inlet opening of the bag is not always easily established and problems such as leakage can be difficult to detect or notice. Thus, there is a need to prevent problems such as leakage in the attachment of the collector and to indicate proper connection of the collector with the mower.

BRIEF SUMMARY OF THE INVENTION

Accordingly, it is an aspect of the present invention to obviate problems and shortcomings of conventional collector positioning means.

In accordance with one aspect of the present invention, a grass mower for cutting grass and collecting cut grass is provided. The grass mower includes a main body, two handle brackets, a handle, a collector element and two collector brackets. The main body is for cutting grass. The two handle brackets are oppositely mounted on lateral sides of the main body. The handle is coupled to the two handle brackets. The collector element is for collecting the cut grass and is defined by a frame. The frame includes at least two limb elements located on substantially opposite sides of the collector element. The two collector brackets are respectively mounted to the two handle brackets and are configured to respectively accommodate the limb elements. The collector element is mounted on the mower free from the handle.

In accordance with another aspect of the present invention, a grass mower for cutting grass and collecting cut grass is provided. The grass mower includes a main body, a maneuvering element, a collector element, and at least two collector brackets. The main body is for cutting grass. The maneuvering element is coupled to the main body. The collector element is for collecting the cut grass and is defined by a frame. The frame includes at least two limb elements located on substantially opposite sides of the collector element. The two collector brackets are mounted on the main body and are configured to respectively accommodate the limb elements. The collector brackets respectively include a biasing element configured to be actuated as the limb element is accommodated in the collector bracket. The limb element is configured to actuate the biasing element before reaching a stable position with respect to the collector bracket.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 2 is a view of an example frame of a collector element shown with limb elements, the frame being part of the example embodiment shown in FIG. 1.

FIG. 3A is an example view of handle brackets detached from the mower of FIG. 1 with the frame of FIG. 1 mounted on collector brackets of handle brackets.

FIG. 3B is an enlarged, partial view of the right collector bracket as designated in FIG. 3A with a limb element mounted therein.

DESCRIPTION OF EXAMPLE EMBODIMENTS

Figure 1:
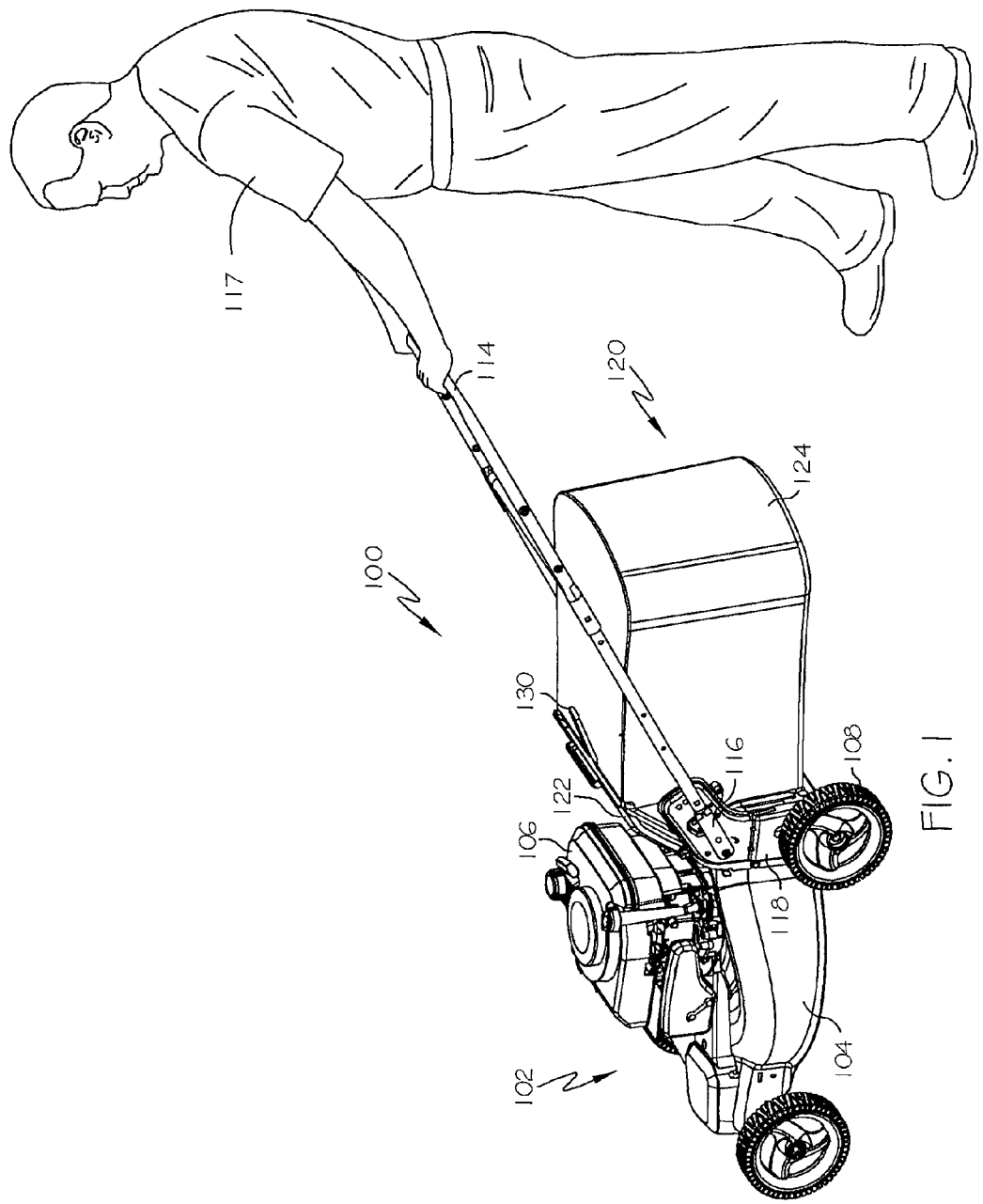
FIG. 1 is a view of a grass mower that includes an example embodiment of the present invention and also shows a user who is located at a walk behind location.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices.

Figure 9:
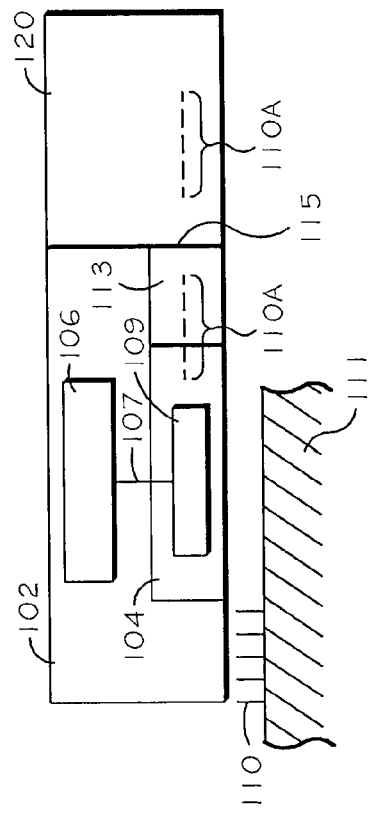
FIG. 9 is a schematic representation showing components of an example embodiment of a grass mower and showing grass cutting and grass collecting in accordance with the present invention.
Figure 8:
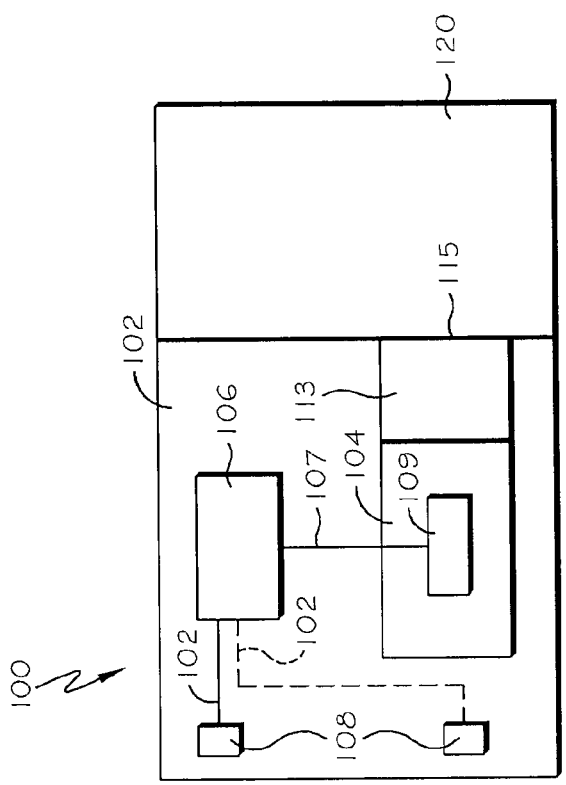
FIG. 8 is a schematic representation showing components of an example embodiment of a grass mower in accordance with the present invention.

FIG. 1 shows an example embodiment of an apparatus in which the invention can be implemented and illustrates a grass mower 100 that is of a walk-behind type. FIG. 8 schematically shows components of the grass mower 100 and FIG. 9 schematically shows the operation of the grass mower 100. The mower 100 includes a main body 102 which may comprise a deck 104, a power source 106, such as an engine or a motor (e.g., electric), operatively coupled 107 to a grass cutting blade 109 (grass is schematically shown in FIG. 9 as item 110) and ground engaging wheels 108 (ground is schematically shown in FIG: 9 as item 111), some or all of which may be operatively coupled 112 to the power source 106. Thus, it will be appreciated that grass 110 is cut within the main body 102 (see FIG. 9, some components are omitted from FIG. 9 so that operation is more easily seen). A chute 113 may be provided at the rear of the main body 102 and grass clippings 110A from the blade 109 are directed through the chute 113 at the end of which is a discharge opening 112.

The mower 100 may be further provided with a maneuvering element 114 to allow operation of the mower 100 in a direction desired by a user 117. The maneuvering element 114 may be a substantially U-shaped handle as shown in this embodiment, a control stick, a steering wheel, or the like. In this embodiment, the maneuvering element 114 is provided with ends 116 that are coupled to the main body 102 through handle brackets 118 mounted at the rear of the main body 102 on laterally opposite sides of the mower 100. The handle brackets 118 may be mounted in an upright manner on the mower 100 and the ends 116 of the maneuvering element 114 may be coupled on outer sides 118a (FIG. 3A) of the handle brackets 118.

A collector element 120 encompasses various means for collecting grass 110A and may be a bag, a box or the like. The collector element 120 may be attached to the discharge opening 115 so that grass clippings 110A can be collected in the collector element 120. A pivoting door 122 with a door handle may be provided so as to conceal the discharge opening when the collector element 120 is detached from the main body 102 and to reveal the discharge opening when the collector element 120 is to be attached. The collector element 120 may comprise a fabric element 124 which bounds a space in which grass clippings 110A may be gathered. The fabric element 124 is supported and held by a frame 126 (see FIG. 2) of the collector element 120. FIG. 2 shows an example embodiment of the collector element 120 from which the fabric element 124 has been omitted for clarity of illustration and thus shows only the frame 126. The frame 126 may be polymeric, metallic or of any material chosen based on rigidity, flexibility, lightness, durability and other factors. The collector element 120 may be provided with a grip handle 130 that is configured to protrude from the fabric element 124 and allows manipulation of the collector element 120 during attachment and detachment (see FIGS. 1 and 3A). The grip handle 130 may be integrated into the frame 126.

FIGS. 8 and 9 thus show the main body 102 of the grass mower 100 with its deck 104, power source 106, operatively coupled 107 to the blade 109 to cut grass 110 into clippings of grass 110A. The grass 110/110A is cut within the main body 102 and the cut grass is directed through the chute 113. The collector element 120 is attached to the discharge opening 112 of the chute 113 of the main body. The collector element 120 collects the grass clippings 110A.

Figure 3C:
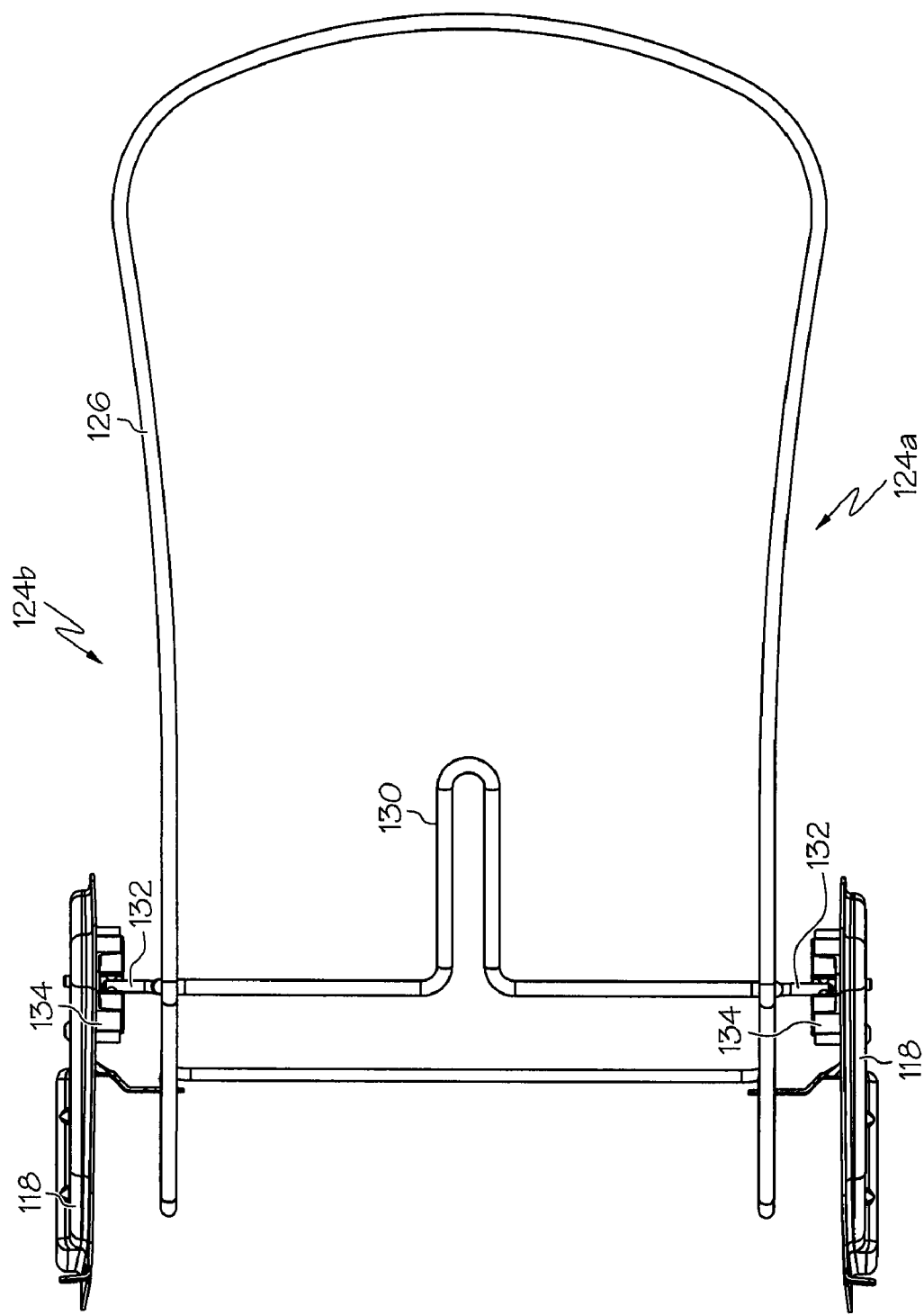
FIG. 3C is a top view of the handle brackets, collector brackets and the frame shown in FIG. 3A.

Limb elements 132 (see FIGS. 2, 3B and 3C) are provided on the collector element 120 and are one of the means by which the collector element 120 engages the mower 100. The collector element 120 may have two substantially opposite sides and each of the side may be configured with a limb element 132. In this example embodiment, as shown in FIGS. 2 and 3C, the limb elements 132 project outwardly from lateral sides 124a, 124b of the collector element 120. The limb elements 132 may be substantially cylindrical in shape to allow rotation of the collector element 120 about the longitudinal axis of the limb elements 132 in a mounted state. The limb elements 132 may be integrated into the frame 126, as in this embodiment, or may be separate from the frame 126.

FIG. 3A shows collector brackets 134 of the mower 100. Other parts of the mower 100 are omitted for clarity. The collector brackets 134 are provided on the mower 100 in order to accommodate the collector element 120 and the limb elements 132 in between as shown in FIG. 3C. The collector brackets 134 may be mounted anywhere on the mower 100 a predetermined distance apart such that the collector brackets 134 provide sufficient room for engagement and disengagement of the limb elements 132 while not being too far apart. In this embodiment, the collector brackets 134 are mounted on inner sides 118b of the handle brackets 118 and upwardly with respect to the handle brackets 118 although the collector brackets 134 may be mounted elsewhere on the handle brackets 118.

Figure 4A:
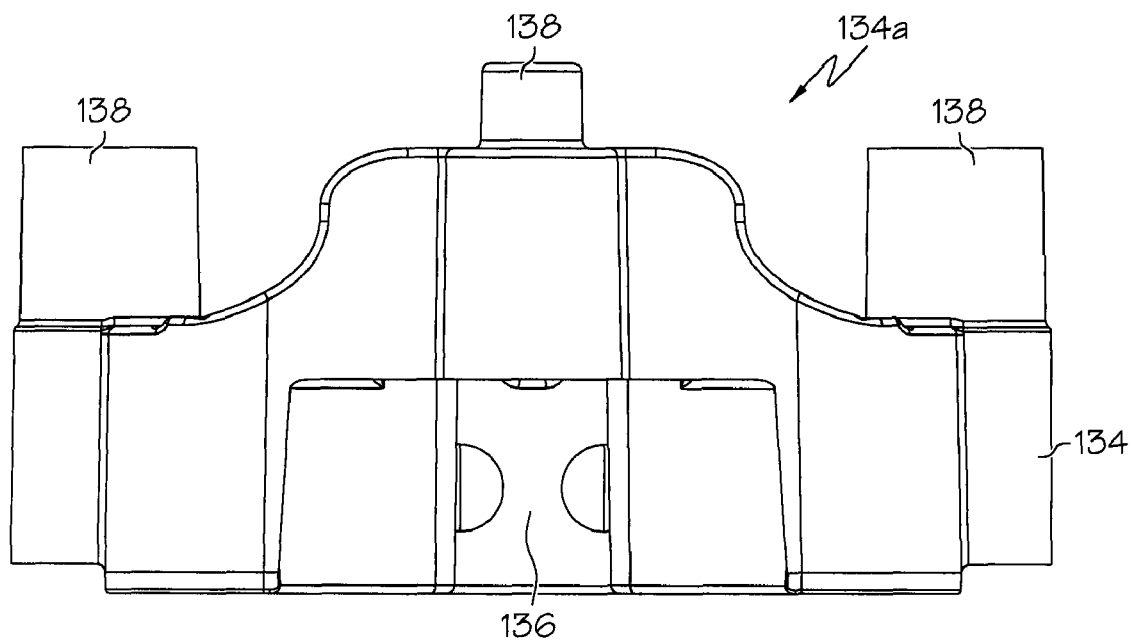
FIG. 4A is an enlarged top view of the collector bracket and a passage therein.
Figure 4B:
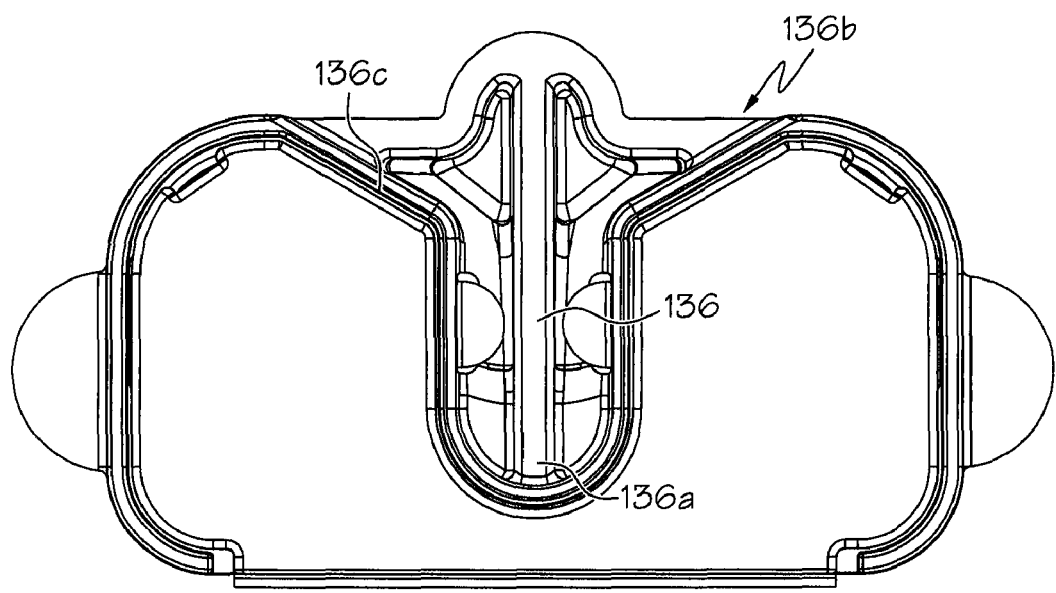
FIG. 4B is a side view of the collector bracket and the passage shown in FIG. 4A.

FIG. 3B shows the right collector bracket 134 with the limb element 132 mounted therein. As shown in FIGS. 3B, 4A and 4B, each collector bracket 134 can respectively receive each limb element 132 by providing a passage 136 traveled by an end 132a of limb element 132 before the collector element 120 is firmly mounted on the mower 100. Although the passage 136 in this embodiment has a substantially downward path as shown in FIGS. 4A-4B, the passage 136 may be oriented in other directions, such as sideways, and the directions may change before an end 136a of the passage 136 is reached. The limb element 132 may reach a stable position once the end 132a of the limb element 132 arrives at an end 136a of the passage 136. Moreover, an entry portion 136b of the passage 136 may be provided with sloped portions 136c so that, even if the user 117 fails to insert the limb element 132 into the passage 136 in an initial attempt, the sloped portions 136c will direct the end 132a of the limb element 132 into the passage 136 thereby facilitating engagement of the passage 136 by the limb element 132. On an outer side 134a of the collector bracket 134, the collector bracket 134 may be provided with projections 138 that are inserted into holes on an inner side 118b of the handle bracket 118.

Figure 5:
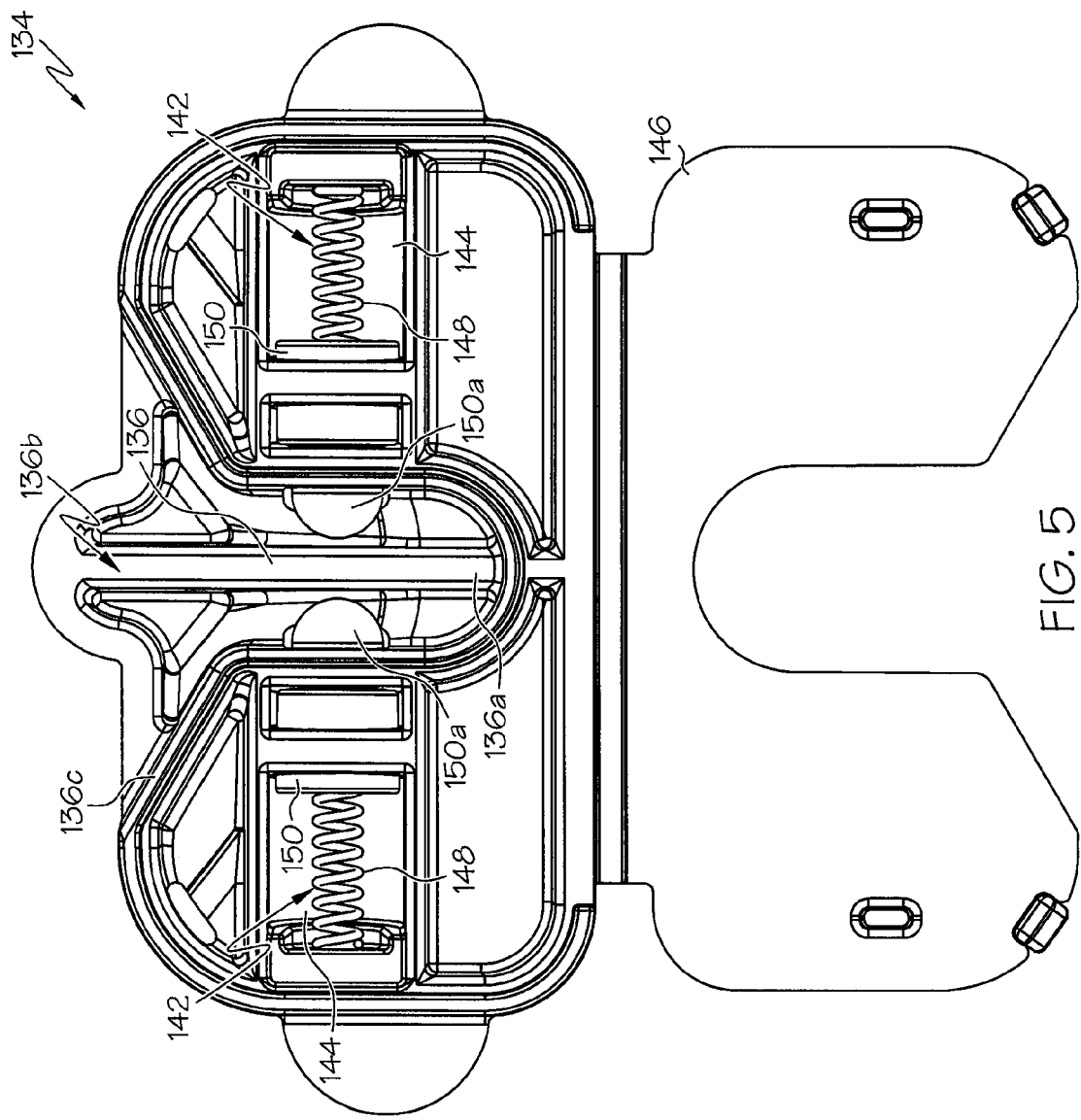
FIG. 5 is a further enlarged side view of the collector bracket of FIG. 4B with a hinged cover in an open state and two biasing elements shown inside.

As shown in FIG. 5, the collector bracket 134 may include at least one biasing element 142 for indicating a stable position of the limb element 132. The present embodiment includes two biasing elements 142. As in this embodiment, the biasing element 142 may be housed in a cavity 144 in the collector bracket 134 and the collector bracket 134 may be provided with a pliable or hinged cover 146 that may be opened to access the biasing element 142. The biasing element 142 may include a compression spring 148 and a sliding piece 150. An end of the compression spring 148 is secured to the collector bracket 134 while the other end is coupled to the sliding piece 150 that can move within the cavity 144.

An end 150a of the sliding piece 150 may be round and, in a default position 154 of the biasing element 142, may project into the passage 136 so as to partially obstruct the passage 136 and hinder the travel of the end 132a of the limb element 132. In the default position, the spring 148 may be in a non-compressed or slightly compressed state. As the limb element 132 travels through the passage 136 and encounters the sliding piece 150, the sliding piece 150 becomes dislodged and is actuated along an axis of the cavity 144 enabling the limb element 132 to pass through. The round shape of the end 150a facilitates the travel of the limb element 132 although an alternate shape of the end 150a may also allow the limb element 132 to pass. After the limb element 132 passes by the projecting sliding piece 150, the limb element 132 may reach a stable position 152 at the end 136a of the passage 136 or possibly beforehand.

Depending on various configurations of the present invention, the limb element 132, at its stable position 152, may or may not be in contact with the biasing element 142 or specifically the sliding piece 150. The limb element 132 may be in contact with the sliding piece 150 in the stable position 152 such that the spring 148 is more compressed than in the default position 154 thus forcing the sliding piece 150 out of the default position 154. Alternatively, the biasing element 142 may be at the default position 154 when the limb element 132 reaches the stable position 152 and the limb element 132 may or may not be in contact with the biasing element. Regardless of the relative positions of the limb element 132 and the biasing element 142 in the stable position 152, the actuation of the biasing element 142 can positively indicate to user 117 that the limb element 132 has reached the stable position 152 and that the collector element 120 is properly mounted on the mower 100. This indication can be associated with a snap into place action as the limb element 132 moves past each sliding piece 150 and the sliding piece 150 experiences a return movement under the bias of the biasing element 142.

Figure 6A:
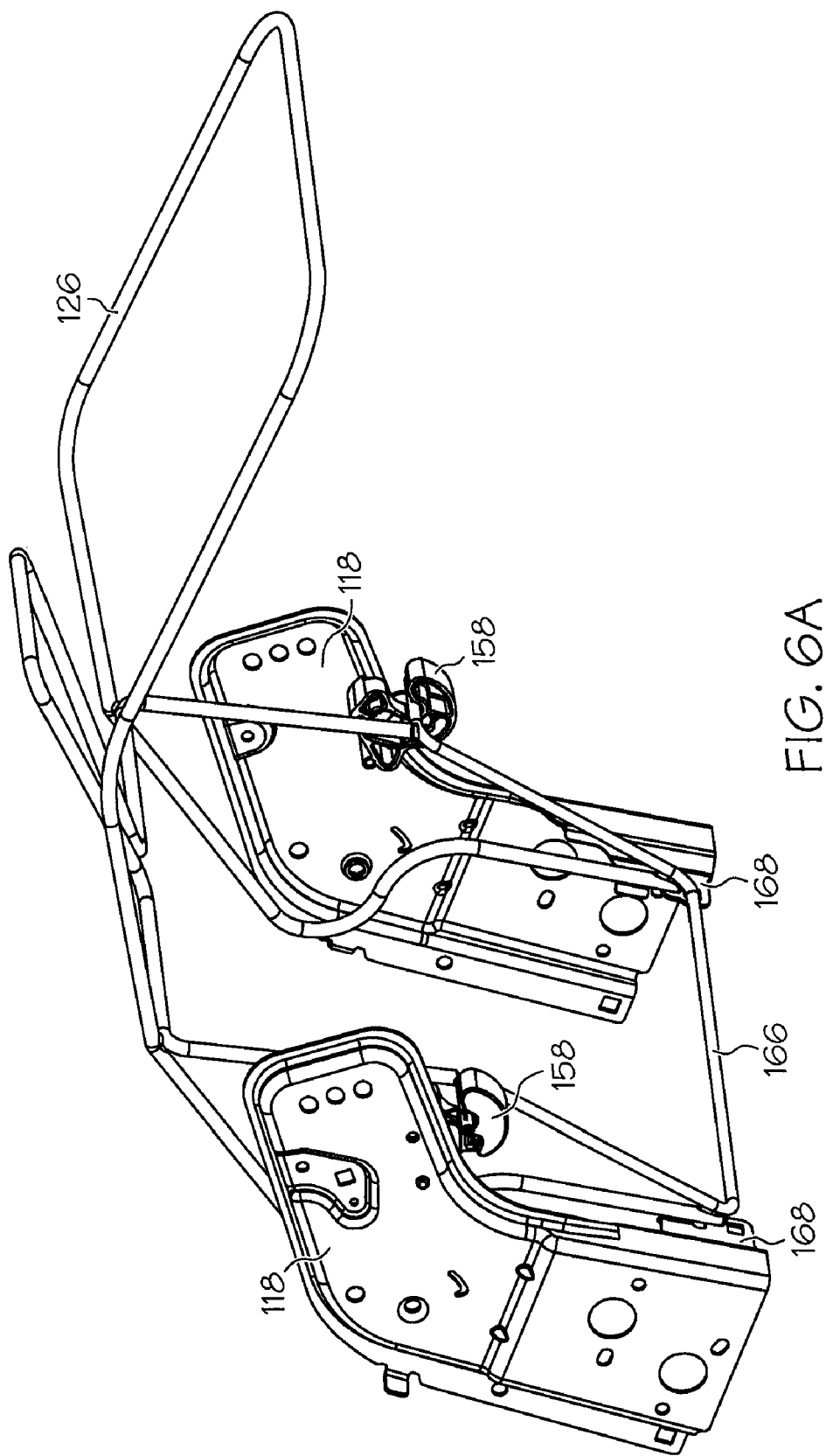
FIG. 6A shows a second embodiment of collector brackets mounted on handle brackets.

Once the collector element 120 is mounted on the mower 100 by inserting the limb elements 132 into the respective passages of the collector brackets, a transverse portion 166 of the collector element 120 may abut the main body 102 and the collector element 120 is prevented from pivoting about the longitudinal axis of the limb elements 132 as shown in FIG. 6A. In this regard, a part of the frame 126 that abuts the discharge opening may be configured to correspond to a shape of the main body 102. Moreover, the handle brackets 118 may further provide ribs 168 against which the frame 126 may rest after the collector element 120 is mounted on the mower 100. Because the collector brackets 158 are mounted on the handle brackets 118 and the collector element 120 rests against the collector brackets 158 and the ribs 168, the collector element 120 may be mounted on the mower 100 free of any coupling with the maneuvering element 114 so that the collector element 120 is not hindered or affected directly by the manipulation of the maneuvering element 114.

Figure 6B:
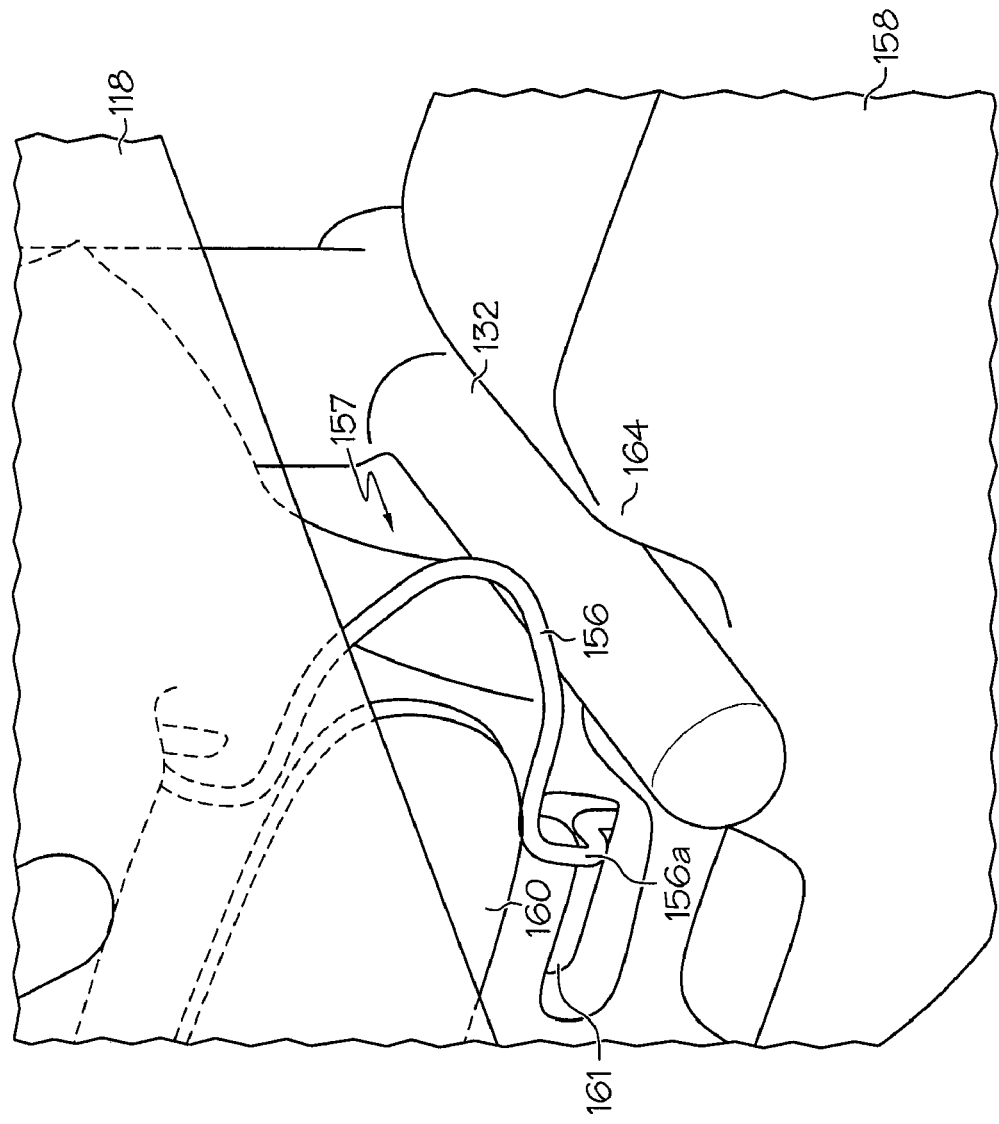
FIG. 6B is an enlarged, fragment view of the left collector bracket of FIG. 6A with a limb element in the passage.

It must be noted that the shapes of the collector brackets or the handles brackets may vary. Accordingly, FIGS. 6A-6B show an alternative collector bracket 158. FIG. 6B is an enlarged, fragment view of the left collector bracket 158 of FIG. 6A and the handle bracket 118 is shown in a transparent state for clarity of illustration. The biasing element may include a V-shaped spring 156 and a collector bracket 158 may include a raised portion 160 that the V-shaped spring 156 surrounds when the spring 156 is mounted on the collector bracket 158. The V-shaped spring 156 may be secured to the collector bracket 158 by inserting each end 156a of the V-shape into slots 161 of the collector bracket 158 in which each end 156a can travel.

In a default position (not shown) of the biasing element, the spring 156 partially obstructs a passage 157 provided for the limb element 132. As the limb element 132 proceeds through the passage 157, the spring 156 is actuated along an axis substantially parallel to the slots 161 provided for the ends 156a of the spring 156. The V-shape of the spring 156 is thereby deformed to become wider than its original state and the spring 156 is biased project back out toward the passage 157. The raised portion 160 may be shaped to gradually widen the V-shape of the spring 156 as the limb element 132 pushes the spring 156 into the raised portion 160 and away from the passage 157. In the embodiment shown, the biasing element maintains the limb element 132 in a stable position 164 although in alternative embodiments the limb element 132 may be configured to be out of contact with the biasing element in the stable position 164.

Figure 7A:
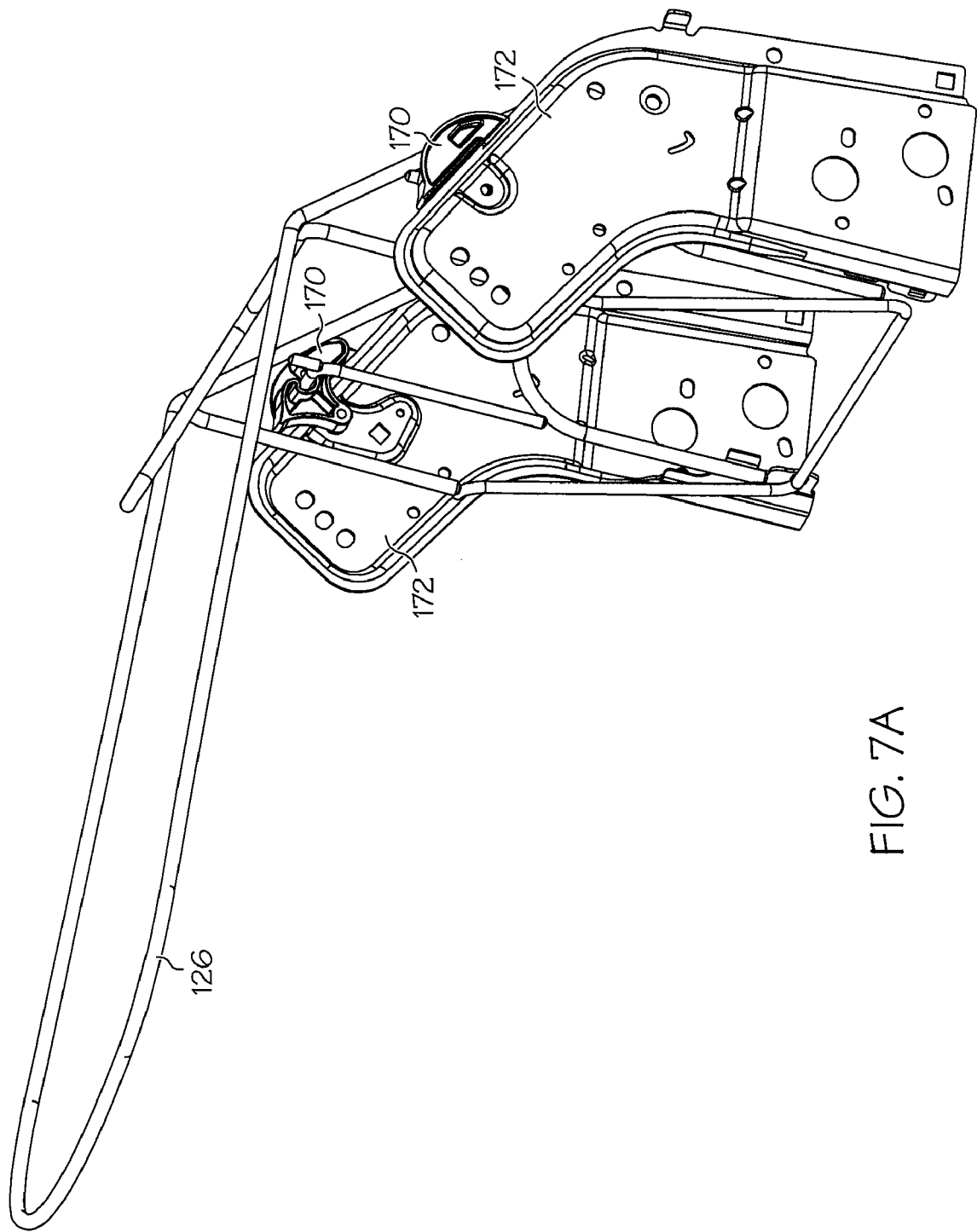
FIG. 7A shows a third embodiment of collector brackets mounted on handle brackets.
Figure 7B:
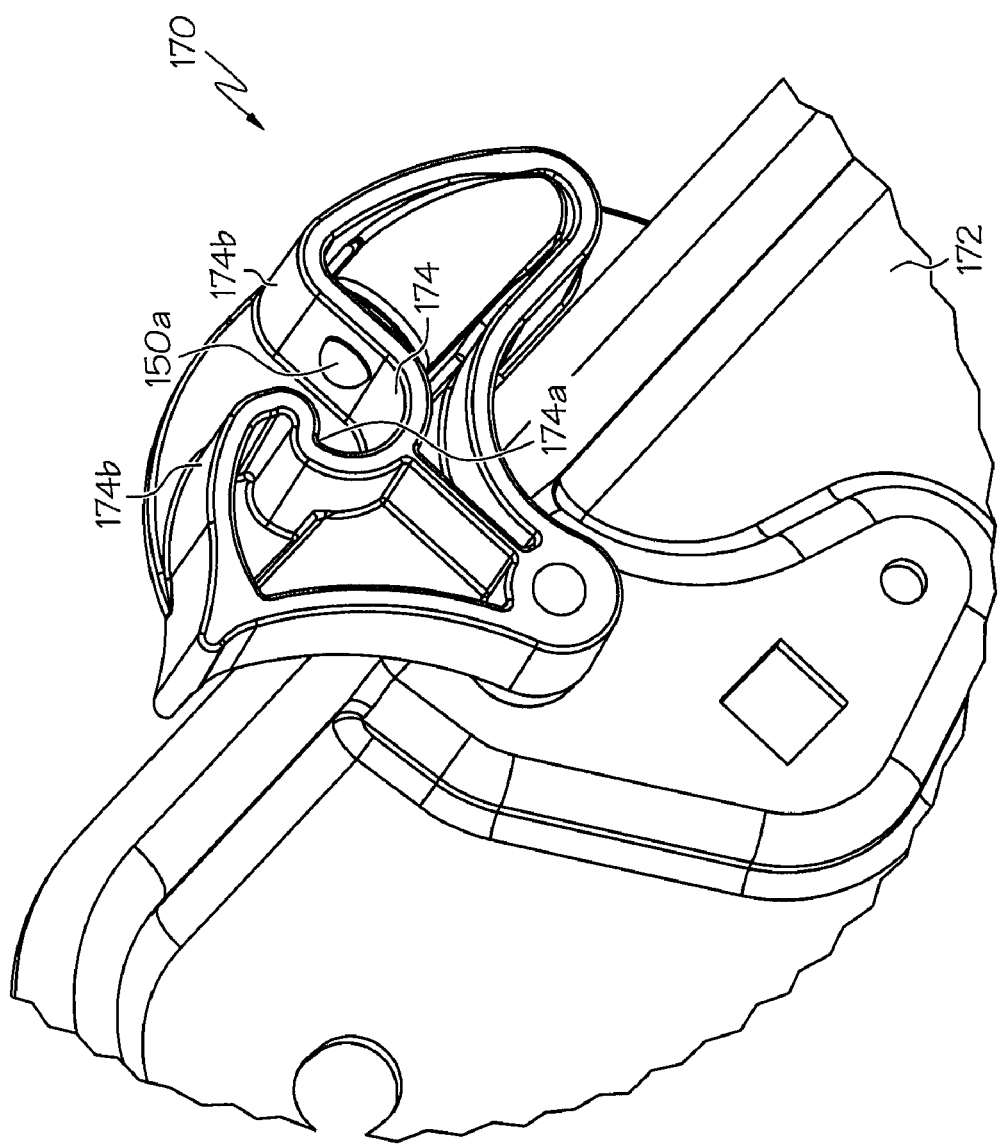
FIG. 7B is an enlarged, fragment view of the left collector bracket with the frame removed therefrom.

Moreover, it should be noted that the locations of the collector brackets about the handle brackets can vary by embodiment. Accordingly, FIGS. 7A and 7B show an alternatively-shaped collector bracket 170 that may be located at an alternative location with respect to the handle bracket 172. In FIG. 7B, which is an enlarged, fragment view of the left collector bracket 170 of FIG. 7A without the frame 126, the collector brackets 170 may be located at a substantially upward portion of the handle bracket 172 such that the collector brackets 170 and the corresponding passages 174 are less obstructed visually by the handle brackets 172 or any other part of the mower 100. The passage 174 may include an entry portion 174b that may be tapered in a curved manner to help direct the limb element 132 into the passage 174. Furthermore, the collector bracket 170 may house only one biasing element including the compression spring 148, the sliding piece 150 with the end 150a that may partially obstruct the passage 174 as discussed above. An end of the passage 174 may be provided with a depression 174a that deviates or strays from the passage 174 and acts as a stop providing a detent in the stable position for the limb element 132 in the collector bracket 170 as shown in FIG. 7A. The limb element 132 may or may not contact the end 150a. It must be noted that changes in the locations of the collector brackets 170 may result in a change in the shape of the frame 126. The location of the limb elements 132 of the frame 126 may be altered to accommodate for the change in the locations of the collector brackets 170 and the rest of the frame 126 may change in shape as well to ensure that no leakage is created between the discharge opening of the mower and the collector element 120.

The invention is provided so that user 117 of the mower can observe the engagement of the collector bracket and the limb element 132 as the engagement occurs, and determine whether the collector element 120 is being properly installed on the mower. In this regard, the collector brackets and the limb elements 132 are located in easily visible areas. However, it may also be possible for the user 117 to perceive whether mounting of the collector element 120 is being done properly based on the actuation of the biasing element even if the collector bracket and the limb element 132 are out of sight. Moreover, manipulation of the maneuvering element 114 or handle does not directly affect or disturb the collector element 120 because the collector element 120 is mounted using the collector brackets 158 and the ribs 168.

The invention has been described with reference to the example embodiments described above. Modifications and alterations will occur to others upon a reading and understanding of this specification. For example, cut grass 110A may also include other yard debris which may or may not be cut, ground, pulverized or comminuted prior to introduction into the collector element. Thus, it is to be appreciated that cut grass 110A and the operation associated therewith should be so interpreted. Example embodiments incorporating one or more aspects of the invention are intended to include all such modifications and alterations insofar as they come within the scope of the appended claims.

What is claimed is:

1. A walk-behind grass mower for cutting grass and collecting cut grass including:
   a main body including a deck, an engine operatively coupled to a grass cutting blade, and ground engaging wheels, a chute being provided at a rear of the main body such that grass cut by the blade within the main body is directed through the chute to a discharge opening at an end of the chute;
   two handle brackets oppositely mounted on lateral sides of the main body;
   a maneuvering handle coupled to the two handle brackets to allow operation of the mower in a direction desired by a user of the grass mower who is located at a walk behind location;
   a collector element attached to the discharge opening at the end of the chute collects the cut grass cut by the blade within the main body and directed through the chute to the discharge opening at an end of the chute, the collector element being defined by a frame, the frame including at least two limb elements located on substantially opposite sides of the collector element; and
   two collector brackets respectively mounted to the two handle brackets and configured to respectively accommodate the limb elements, wherein the collector element is mounted on the mower free from the handle.

2. The walk-behind grass mower according to claim 1, wherein the collector element is not coupled with the handle and is not supported from the handle during the operations of grass cutting and collecting of the cut grass.

3. The walk-behind grass mower according to claim 1, wherein the collector brackets respectively include a biasing element configured to be actuated as the limb element is accommodated in the bag bracket, and the limb element is configured to actuate the biasing element before reaching a stable position with respect to the collector bracket.

4. The walk-behind grass mower according to claim 3, wherein the collector brackets are configured with a passage traveled by the limb element before reaching the stable position.

5. The walk-behind grass mower according to claim 4, wherein the biasing element projects into the passage so as to partially obstruct the passage in a default position, the biasing element capable of being temporarily dislodged from the default position as the limb element moves toward the stable position.

6. The walk-behind grass mower according to claim 4, wherein an entry portion of the passage is flared to facilitate entry of the limb element into the passage.

7. The walk-behind grass mower according to claim 1, wherein the collector brackets are located at a substantially upward portion of the handle brackets so as to reduce visual obstruction to a user who is located at the walk behind location.

8. The walk-behind grass mower according to claim 1, wherein the maneuvering handle is U-shaped with two ends extending to be coupled to the two handle brackets, and the collector element is located between the handle brackets such that the collector element is not supported by the maneuvering handle.

9. A walk-behind grass mower for cutting grass and collecting cut grass including:
a main body including a deck, an engine operatively coupled to a grass cutting blade, and ground engaging wheels, a chute being provided at a rear of the main body such that grass cut by the blade within the main body is directed through the chute to a discharge opening at an end of the chute;
a maneuvering element coupled to the main body to allow operation of the mower in a direction desired by a user of the grass mower who is located at a walk behind location;
a collector element attached to the discharge opening at the end of the chute collects cut by the blade within the main body and directed through the chute to the discharge opening at an end of the chute, the collector element being defined by a frame, the frame including at least two limb elements located on substantially opposite sides of the collector element; and
at least two collector brackets mounted on the main body and configured to respectively accommodate the limb elements, the collector brackets respectively including a biasing element configured to be actuated as the limb element is accommodated in the collector bracket, the limb element configured to actuate the biasing element before reaching a stable position with respect to the collector bracket.

10. The mower according to claim 9, wherein the collector bracket is configured with a passage traveled by the limb element before reaching the stable position.

11. The walk-behind grass mower according to claim 10, wherein the biasing element projects into the passage so as to partially obstruct the passage in a default position, the biasing element capable of being temporarily dislodged from the default position as the limb element moves toward the stable position.

12. The walk-behind grass mower according to claim 11, wherein the biasing element includes a compression spring.

13. The walk-behind grass mower according to claim 11, wherein the biasing element includes a V-shaped spring.

14. The walk-behind grass mower according to claim 10, wherein an end of the passage is provided with a depression deviating from the passage and acting as a stop for the limb element.

15. The walk-behind grass mower according to claim 10, wherein an entry portion of the passage is flared to facilitate entry of the limb element into the passage.

16. The walk-behind grass mower according to claim 9, wherein handle brackets are mounted on lateral sides of the main body, and the collector brackets are mounted on the handle brackets.

17. The walk-behind grass mower according to claim 16, wherein the collector brackets are located at a substantially upward portion of the handle brackets so as to reduce visual obstruction to a user who is located at the walk behind location.

18. The walk-behind grass mower according to claim 17, wherein the maneuvering element is a U-shaped handle with two ends, and the two ends are mounted on the handle brackets.

19. The walk-behind grass mower according to claim 18, wherein the collector element is mounted on the mower free from the maneuvering element such that the collector element is not supported by the maneuvering handle.

20. The walk-behind grass mower according to claim 18, wherein the two ends are coupled to outer sides of the handle brackets and the collector brackets are coupled to inner sides of the handle brackets.

21. The walk-behind grass mower according to claim 9, wherein the mower is a walk-behind mower.

* * * * *